United States Patent
Ellis et al.

(10) Patent No.: US 9,367,353 B1
(45) Date of Patent: Jun. 14, 2016

(54) STORAGE CONTROL SYSTEM WITH POWER THROTTLING MECHANISM AND METHOD OF OPERATION THEREOF

(71) Applicant: SMART Storage Systems, Inc., Chandler, AZ (US)

(72) Inventors: Robert W. Ellis, Phoenix, AZ (US); Kenneth B. DelPapa, Madison, WI (US); Gregg S. Lucas, Tucson, AZ (US); Ryan Jones, Mesa, AZ (US)

(73) Assignee: SANDISK TECHNOLOGIES INC., Plano, TX (US)

( * ) Notice: Subject to any disclaimer, the term of this patent is extended or adjusted under 35 U.S.C. 154(b) by 178 days.

(21) Appl. No.: 13/926,824

(22) Filed: Jun. 25, 2013

(51) Int. Cl.
*G06F 9/48* (2006.01)
*G06F 1/26* (2006.01)

(52) U.S. Cl.
CPC ............... *G06F 9/4893* (2013.01); *G06F 1/26* (2013.01)

(58) Field of Classification Search
CPC .................................. G06F 9/4893; G06F 1/26
USPC ........................................................... 713/340
See application file for complete search history.

(56) References Cited

U.S. PATENT DOCUMENTS

| | | | |
|---|---|---|---|
| 4,048,481 A | 9/1977 | Bailey, Jr. et al. | |
| 4,839,587 A | 6/1989 | Flatley et al. | |
| 5,034,744 A | 7/1991 | Obinata | |
| 5,210,854 A | 5/1993 | Beaverton et al. | |
| 5,311,395 A | 5/1994 | McGaha et al. | |
| 5,450,354 A | 9/1995 | Sawada et al. | |
| 5,479,638 A | 12/1995 | Assar et al. | |
| 5,784,174 A | 7/1998 | Fujino et al. | |
| 5,790,828 A | 8/1998 | Jost | |
| 5,930,504 A | 7/1999 | Gabel | |
| 5,949,785 A | 9/1999 | Beasley | |
| 5,963,983 A | 10/1999 | Sakakura et al. | |
| 6,034,897 A | 3/2000 | Estakhri et al. | |
| 6,069,827 A | 5/2000 | Sinclair | |

(Continued)

FOREIGN PATENT DOCUMENTS

| | | | |
|---|---|---|---|
| EP | 1 956 489 A2 | 8/2008 | |
| EP | 1 990 921 A2 | 11/2008 | |

(Continued)

OTHER PUBLICATIONS

Ulinktech, "ATA Command Table (in Alphabetic Order)," Feb. 6, 2011, https://web.archive.org/web/20110206060820/http://www.ulinktech.com/downloads/AT, 6 pages.

(Continued)

*Primary Examiner* — Thomas Lee
*Assistant Examiner* — Chad Erdman
(74) *Attorney, Agent, or Firm* — Morgan, Lewis & Bockius LLP

(57) ABSTRACT

A storage control system, and a method of operation thereof, including: a host interface module for receiving a host command from a host system; a power measurement module, coupled to the host interface module, for reading a current value of an electrical power supplied by the host system in response to the host command; and a schedule module, coupled to the power measurement module, for scheduling new operations to be executed in parallel in non-volatile memory devices, the new operations are scheduled when the current value of the electrical power does not exceed a power limit.

21 Claims, 8 Drawing Sheets

(56) References Cited

U.S. PATENT DOCUMENTS

| | | |
|---|---|---|
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, Iii et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,725,931 B1 | 5/2014 | Kang |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,862,818 B1 | 10/2014 | Ozdemir |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1* | 4/2007 | Winick et al. ............... 713/300 |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry et al. |
| 2007/0263444 A1 | 11/2007 | Gorobets et al. |
| 2007/0276973 A1 | 11/2007 | Tan et al. |
| 2008/0028246 A1* | 1/2008 | Witham ..................... 713/330 |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |

(56) References Cited

U.S. PATENT DOCUMENTS

| | | | |
|---|---|---|---|
| 2009/0125670 A1 | 5/2009 | Keays |
| 2009/0132756 A1 | 5/2009 | Hsieh |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0183183 A1 | 7/2009 | Muppirala et al. |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 | 4/2010 | Heo et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0325340 A1 | 12/2010 | Feldman et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1* | 6/2011 | Sinclair ............... 711/5 |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0023144 A1 | 1/2012 | Rub |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1* | 7/2012 | Sistla et al. ............... 713/300 |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1* | 12/2012 | Lassa et al. ............... 711/103 |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0073797 A1 | 3/2013 | Chowdhury |
| 2013/0074093 A1 | 3/2013 | Gounares et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0290611 A1* | 10/2013 | Biederman ............ G11C 16/30 711/103 |
| 2013/0304998 A1 | 11/2013 | Palmer |
| 2013/0326116 A1 | 12/2013 | Goss et al. |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |
| 2014/0158525 A1* | 6/2014 | Greene ............... 204/229.2 |
| 2014/0181370 A1 | 6/2014 | Cohen et al. |
| 2014/0208174 A1 | 7/2014 | Ellis et al. |
| 2014/0258769 A1 | 9/2014 | Baryudin et al. |
| 2014/0372777 A1 | 12/2014 | Reller et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 | 4/2009 |
| WO | WO 2011/156466 | 12/2011 |

OTHER PUBLICATIONS

International Seearch Report dated Mar. 25, 2014, received in International Patent Application No. PCT/US2013/072400, which corresponds to U.S. Appl. No. 13/690,337, 3 pages (Ellis).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

(56) References Cited

OTHER PUBLICATIONS

International Search Report and Written Opinion dated Jul. 31, 2014, received in International Patent Application No. PCT/US2014/033876, which corresponds to U.S. Appl. No. 13/861,326, 9 pages (Fitzpatrick).
International Search Report and Written Opinion dated Aug. 22, 2014, received in International Patent Application No. PCT/US2014/032978, which corresponds to U.S. Appl. No. 14/081,992, 10 pages (Ellis).
International Search Report and Written Opinion dated Nov. 7, 2014, received in International Patent Application No. PCT/US2014/049732, which corresponds to U.S. Appl. No. 14/334,350, 13 pages (Fitzpatrick).
International Search Report and Written Opinion dated Oct. 17, 2014, received in International Patent Application No. PCT/US2014/049734, which corresponds to U.S. Appl. No. 14/332,259, 8 pages (Higgins).
International Search Report and Written Opinion dated Oct. 23, 2014, received in International Patent Application No. PCT/US2014/049736, which corresponds to U.S. Appl. No. 14/446,249 8 pages (Fitzpatrick).
international Search Report and Written Opinion dated Nov. 5, 2014, received in International Patent Application No. PCT/US2014/049282, which corresponds to U.S. Appl. No. 13/957,407, 12 pages (Fitzpatrick).
Tseng et al., "Understanding the Impact of Power Loss on Flash Memory," DAC'11, Jun. 5-10, 2011, San Diego, California, 6 pages.
Narayanan et al., "Migrating Server Storage to SSDs: Analysis of Tradeoffs," Computer Systems, Apr. 2009, 12 pages.
Shiraz et al., "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Yimo et al "WeLe-RAID: A SSD-Based RAID for System Endurance and Performance," Jan. 2011, Network and Parallel Computing, Springer, 14 pages.
International Search Report and Written Opinion dated Jan. 9, 2015, received in International Patent Application No. PCT/US2014/049731, which corresponds to U.S. Appl. No. 14/334,324, 9 pages (Fitzpatrick).
International Search Report and Written Opinion dated Feb. 18, 2015, received in International Patent Application No. PCT/US2014/065401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).
Cooke, "Introduction to Flash Memory (T1A)," Flash Memory Summit, Aug. 22, 2008, Micron Technology, Inc., 102 pages.
Gal et al., "Algorithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
International Search Report and Written Opinion dated Dec. 20. 2013, received in PCT/US2013/045282, which corresponds to U.S. Appl. No. 13/493,949, 7 pages (Ellis).
International Search Report and Written Opinion dated Jun. 12, 2014, received in PCT/US2014/018972, which corresponds to U.S. Appl. No. 13/779,352, 12 pages (Schmier).
International Search Report and Written Opinion dated May 14, 2014, received in International Patent Application No. PCT/US2014/017168, which corresponds to U.S. Appl. No. 14/076,115 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
Online Merriam Webster Dictionary, definition of "Distinct" from Jun. 12, 2011, https://web.archive.org/web/20110612181129/http://www2.merriam-webster.com/cgi-bin/mwdictadu?book=Dictionary&va=distinct.

* cited by examiner

STORAGE CONTROL SYSTEM WITH POWER THROTTLING MECHANISM AND METHOD OF OPERATION THEREOF

CROSS-REFERENCE TO RELATED APPLICATION(S)

The present application contains subject matter related to U.S. patent application Ser. No. 13/926,900, filed Jun. 25, 2013, now U.S. Pat. No. 9,244,519, entitled "STORAGE CONTROL SYSTEM WITH POWER THROTTLING MECHANISM AND METHOD OF OPERATION THEREOF". The subject matter thereof is incorporated herein by reference thereto.

TECHNICAL FIELD

The present invention relates generally to a storage control system and more particularly to a system for power throttling.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells. The memory transistors of those cells are placed to store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: receiving a host command from a host system; reading a current value of an electrical power supplied by the host system in response to the host command; and scheduling new operations to be executed in parallel in non-volatile memory devices, the new operations are scheduled when the current value of the electrical power does not exceed a power limit.

The present invention provides a storage control system, including: a host interface module for receiving a host command from a host system; a power measurement module, coupled to the host interface module, for reading a current value of an electrical power supplied by the host system in response to the host command; and a schedule module, coupled to the power measurement module, for scheduling new operations to be executed in parallel in non-volatile memory devices, the new operations are scheduled when the current value of the electrical power does not exceed a power limit.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
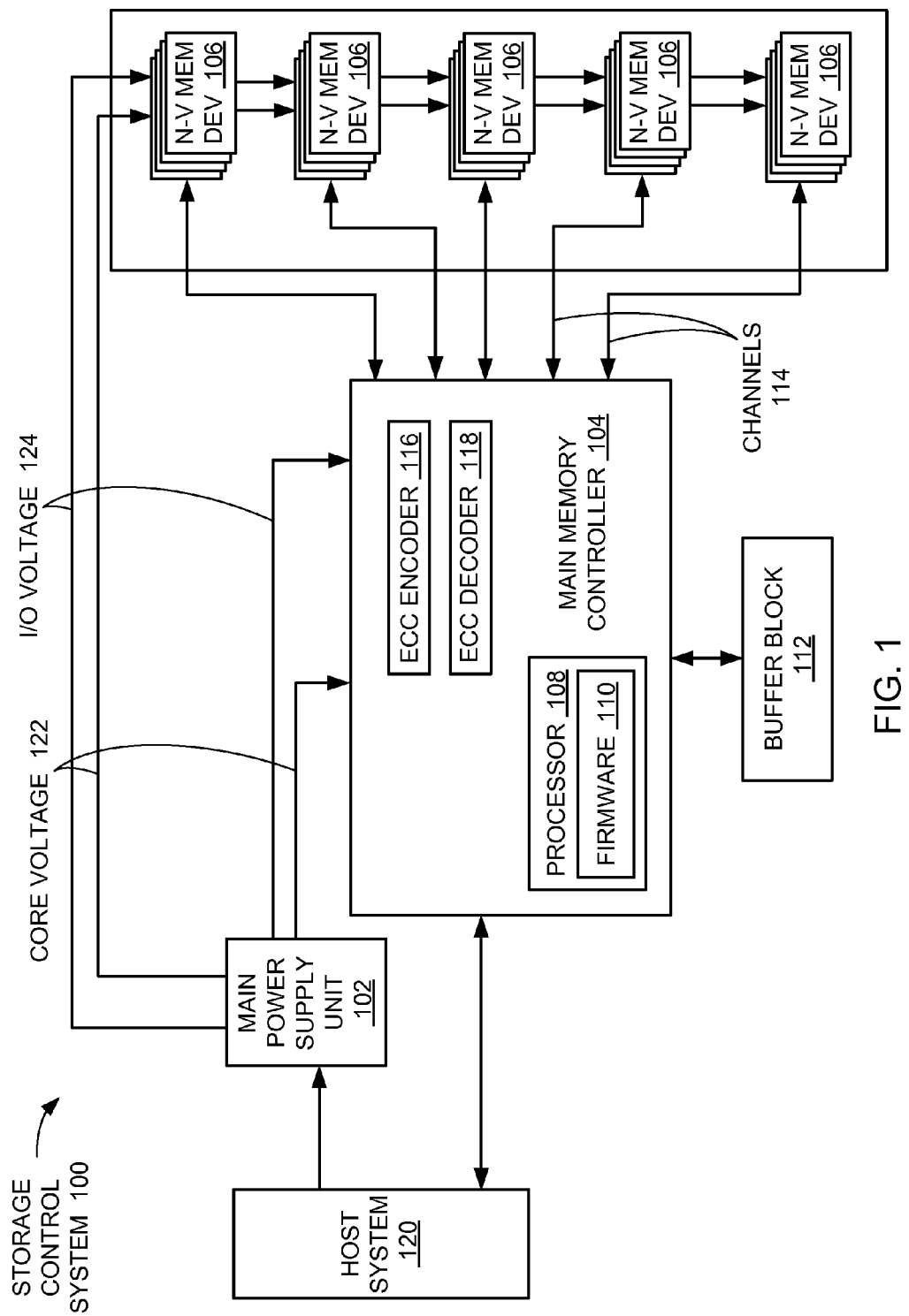
FIG. 1 is a storage control system with power throttling mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

The term "bit error rate" (BER) referred to herein is defined as a number of incorrect bits in a data stream stored in a memory device including NAND. The BER can typically be detected within a code word protected by error correction code (ECC). The term "erase block" referred to herein is defined as a group of pages, which is the smallest number of pages that are erased at one time.

The term "error correction code" (ECC) referred to herein is defined as parity data generated over a set of data grouped into a code word. The term "code word" referred to herein is defined as a group of data bytes covered by a single of multiple ECC parity words. The term "power slope" referred to herein is defined as a value derived from making multiple electrical current/power measurements on a drive changes in its power usage. The term "page" referred to herein is defined as a memory component within an erase bock that is programmed as an individual unit. The page is a smallest group of data bytes that are read from or written to in an erase block.

The term "program/erase cycle" (P/E cycle) referred to herein is defined as a base level operation of how data is replaced within an erase block. For example, a memory device including NAND and other memory types can have a limited number of useful P/E cycles. The term "solid state disk drive" (SSD) referred to herein is defined as a type of devices that use non-volatile memories. For example, a drive or an SSD is a type of devices that use a non-volatile memory including NAND flash as a storage medium.

The term "point of load" (POL) referred to herein is defined as a regulator, which creates a load's needed voltage located physically near the load, as opposed to a single, larger regulator that supplies power to all subsystems or loads. The term "single ended" referred to herein is defined as data transferred on one edge of a clock signal. The term "double data rate" referred to herein is defined as data transferred on both rising and falling edges of a clock signal. The term "real time measurements" referred to herein is defined as data collected from hardware, software, or a combination thereof. The real time measurements represent current states of operation and characteristics of a drive.

The term "open loop" referred to herein is defined as run time adjustments made based on pre-formed tables and operation counts, without monitoring hardware current or power. The term "closed loop" referred to herein is defined as run time adjustments made by monitoring operations dynamically as a drive runs. The term "FIFO" referred to herein is defined as a first in first out memory block. The term "ADC" referred to herein is defined as an analog to digital converter. The term "POLL" referred to herein is defined as a sampling used in software to monitor a status of an event.

Currently, power throttling is performed in a very static way. A typical drive is run and the power is measure for a given performance and workload. From a static power measurement, firmware levels are set to limit a number of outstanding operations that can be executed at a given time. This method does not take into account differences in powers consumed between different drives, an amount of time a flash takes to execute a given operation (which changes over the life of a drive), or controller limitations or execution of commands.

In general, predetermined limits are set at design time for firmware to schedule a given number of operations. The current method runs into real difficulties when recycling, wear leveling, general housekeeping, or other functions run in the background change the load on the NAND. The current method also does not take into account the effects of temperature or NAND age when setting these fixed throttling limits.

More dramatically than hard disk drives, an amount of power that an SSD consumes varies with an amount of host (and internal) activity. This power difference in many cases exceeds two times an idle current for the drive. Additionally, the power usage can be very abrupt and cause power spikes that can create supply voltage transients that can overwhelm a host environment or otherwise exceed the regulation capability of the host power system and take other subsystems offline.

Referring now to FIG. 1, therein is shown a storage control system 100 with power throttling mechanism in an embodiment of the present invention. FIG. 1 depicts a system level block diagram of the storage control system 100. This figure can represent a hardware architecture of an SSD.

The storage control system 100 includes drive level components. The drive level components includes a section for a main power supply unit 102 for providing power supplies to a main memory controller 104 and non-volatile memory devices 106. The main memory controller 104 including a NAND controller includes a processor 108, device controllers (not shown), and memory controllers (not shown). The processor 108 including a central processing unit (CPU) is used to execute a firmware 110.

The device controllers interface with and control the non-volatile memory devices 106 including NAND flash. Although the embodiments described herein refer to using NAND for the non-volatile memory devices 106, it is understood that the embodiments are not limited to using NAND as a memory storage device, which can be monitored and controlled by the main memory controller 104. For example, the non-volatile memory devices 106 include but are not limited to Magnetoresistive random-access memory (MRAM), Ferroelectric RAM (FRAM), and phase-change memory (PCM).

The memory controllers control and interface with a buffer block 112, which is a memory device. For example, in some cases, the buffer block 112 is an external block of memory for tabling and storing data or an array of NAND memory devices. Also for example, the buffer block 112 includes memory and data buffers. Further, for example, the buffer block 112 can include dynamic random access memory (DRAM) or any other volatile memories.

The storage control system 100 includes a number of channels 114 with each of the channels 114 having a number of the non-volatile memory devices 106 including NAND flash devices behind it. There are a number of ways of distributing the data across the channels 114. For example, the data can be distributed using a simple redundant array of independent disks (RAID) 0 stripe. For example, FIG. 1 shows five of the channels 114, although it is understood that there can be any number of the channels 114.

The main memory controller 104 includes an ECC encoder 116 and an ECC decoder 118. The ECC encoder 116 generates ECC parity data for a set of data grouped into a code word to be stored in the non-volatile memory devices 106. The ECC decoder 118 receives and checks ECC parity data for data from the non-volatile memory devices 106. The main memory controller 104 interfaces with a host system 120.

In this configuration, there is no power feedback from any of the components. The main power supply unit 102 is a self-contained unit that generates and provides power for all of the components of the drive based on a main host power input from the host system 120. The main power supply unit 102 provides a core voltage 122 and an I/O voltage 124 to the main memory controller 104 and the non-volatile memory devices 106.

For illustration purposes, only the powers from the main power supply unit 102 are shown, although it is understood that there can be other power signals in the storage control system 100. For example, the storage control system 100 can include power feedback signals from any of the components and most importantly a bank of the non-volatile memory devices 106 including NAND memory devices.

Figure 2:
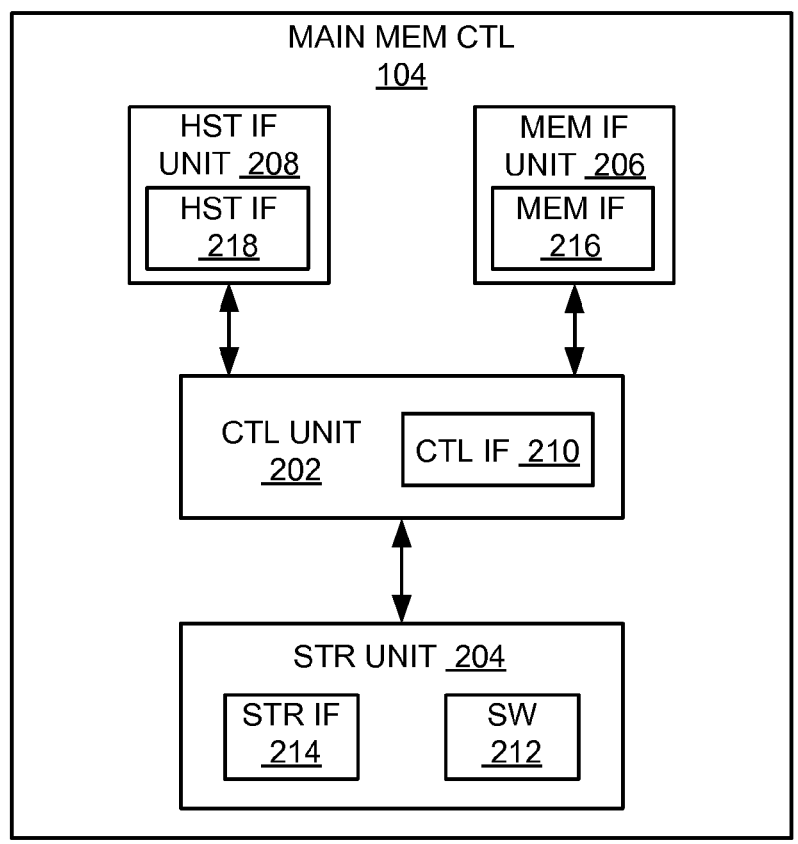
FIG. 2 is an exemplary hardware block diagram of the main memory controller.

Referring now to FIG. 2, therein is shown an exemplary hardware block diagram of the main memory controller 104. The main memory controller 104 can include a control unit 202, a storage unit 204, a memory interface unit 206, and a host interface unit 208. The control unit 202 can include a control interface 210. The control unit 202 can execute a software 212 stored in the storage unit 204 to provide the intelligence of the main memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the main memory controller 104. The control interface 210 can also be used for communication that is external to the main memory controller 104.

The control interface 210 can receive information from the other functional units or from external sources, or can transmit information to the other functional units or to external destinations. The external sources and the external destinations refer to sources and destinations external to the main memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the main memory controller 104. The storage interface 214 can receive information from the other functional units or from external sources, or can transmit information to the other functional units or to external destinations. The external sources and the external destinations refer to sources and destinations external to the main memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the main memory controller 104. For example, the memory interface unit 206 can permit the main memory controller 104 to communicate with the non-volatile memory devices 106 of FIG. 1.

The memory interface unit 206 can include a memory interface 216. The memory interface 216 can be used for communication between the memory interface unit 206 and other functional units in the main memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 120 of FIG. 1 to interface and interact with the main memory controller 104. The host interface unit 208 can include a host interface 218 to provide communication mechanism between the host interface unit 208 and the host system 120.

The control unit 202 can operate the host interface unit 208 to send control or status information generated by the main memory controller 104 to the host system 120. The control unit 202 can also execute the software 212 for the other functions of the main memory controller 104. The control unit 202 can further execute the software 212 for interaction with the non-volatile memory devices 106 via the memory interface unit 206.

The functional units in the main memory controller 104 can work individually and independently of the other functional units. For illustrative purposes, the main memory controller 104 is described by operation of the main memory controller 104 with the host system 120 and the non-volatile memory devices 106. It is understood that the main memory controller 104, the host system 120, and the non-volatile memory devices 106 can operate any of the modules and functions of the main memory controller 104.

Figure 3:
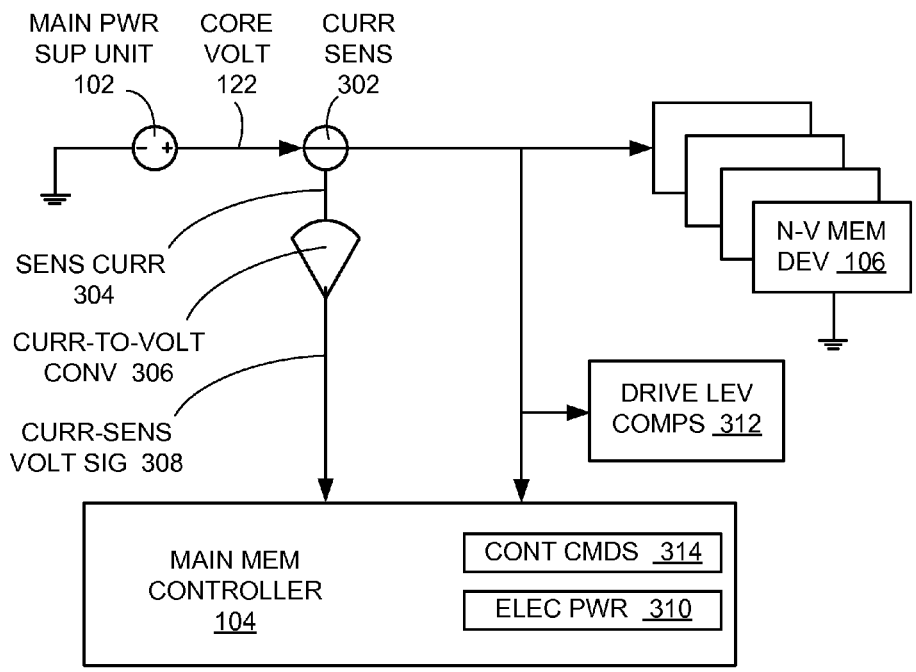
FIG. 3 is a first exemplary block diagram of power measurement for the power throttling mechanism.

Referring now to FIG. 3, therein is shown a first exemplary block diagram of power measurement for the power throttling mechanism. FIG. 3 depicts a high-level block diagram or a top system level architecture of an SSD with a dynamic power control mechanism for the main memory controller 104.

As an SSD goes through different phases of operations including recycling, wear leveling, spare pool and over provisioning resource management, and differing host workloads, the drive can require or utilize differing amounts of power. Most host systems restrict an amount of current, including average and peak currents, which a drive is allowed to use. The embodiments described herein outlines additions and modifications to controller architectures to allow the drive to dynamically adjust its internal operations to limit or throttle average and instantaneous power draws.

There are two methods described herein to construct the dynamic power control mechanism or dynamic current/power throttling for the main memory controller 104. A first method is to employ a set of external circuitry that is added to the main memory controller 104 that allows the firmware 110 of FIG. 1 to make run-time decisions on the current/power throttling, as shown in FIG. 3. A second method of the current/power throttling allows the main memory controller 104 to resolve more power levels but also requires more input/output (I/O) pins, as subsequently shown in FIGS. 4-7.

FIG. 3 is a high-level block diagram that demonstrates power measurement performed at a system level. As will be described later, FIGS. 4-7 show monitoring power usage of the non-volatile memory devices 106.

Any combination of architectures shown by FIGS. 3-7 provides a power smart Solid State Drive (SSD). Some systems today employ a very static method for power level control by limiting a number of parallel or concurrent operations to fixed values. The embodiments described herein take power control to the next level by having hardware, the firmware 110 (or the software 212 of FIG. 2), or a combination thereof to adjust operations of the drive based on "real time measurements".

A firmware version of an implementation of the dynamic power control mechanism includes a number of different options to use the power information. A first option can include a simple sample method that uses an instantaneous electrical current level to determine how many parallel operations to queue up. To prevent a risk associated with possibility of having an overshoot of an electrical current level target, the embodiments described herein employ a running slope measurement to estimate where an electrical current will settle out given a current workload.

Power sampling can be done based on a time trigger or an operational trigger when flash controller jobs are submitted to flash controllers or the main memory controller 104. An electrical current drawn by the non-volatile memory devices 106 and a controller board in general can be translated to a total power consumed by the SSD.

FIG. 3 depicts the core voltage 122 supplied by the main power supply unit 102. The core voltage 122 provides power to the non-volatile memory devices 106 and the main memory controller 104. For example, the core voltage 122 can be a NAND core voltage supply or a direct current (DC) power supply.

The storage control system 100 of FIG. 1 includes a current sensor 302, which is a device that detects an electrical current in a wire. The current sensor 302 generates a sensed current 304, which is a signal proportional to an electrical current provided by a power supply. The sensed current 304 can be an analog current signal. The sensed current 304 can then be utilized by a current-to-voltage converter 306. For example, the current-to-voltage converter 306 can be a trans-impedance amplifier.

The current-to-voltage converter 306 generates a current-sense voltage signal 308 and sends it to the main memory controller 104. An increase of the current-sense voltage signal 308 indicates an increase of an electrical power 310 of the storage control system 100. The electrical power 310 represents a total power drawn or consumed by the non-volatile memory devices 106, the main memory controller 104, and other drive level components 312 of the storage control system 100. The electrical power 310 indicates power consumed by the drive level components through different phases of operations in the drive.

The main memory controller 104 monitors the current-sense voltage signal 308 to determine how many parallel operations or controller commands 314 to queue up. The controller commands 314 are control information generated by the main memory controller 104. The controller commands 314 are for storing, accessing, or managing data in the non-volatile memory devices 106.

The current sensor 302 also provides the core voltage 122 to the non-volatile memory devices 106, the main memory controller 104, and any of the drive level components 312. The core voltage 122 can be an analog voltage that is linearly proportional to the electrical current provided by the main power supply unit 102. The core voltage 122 can be a system-level supply or a power supply input to the main memory controller 104 and a number of the non-volatile memory devices 106 including a NAND media array.

Figure 4:
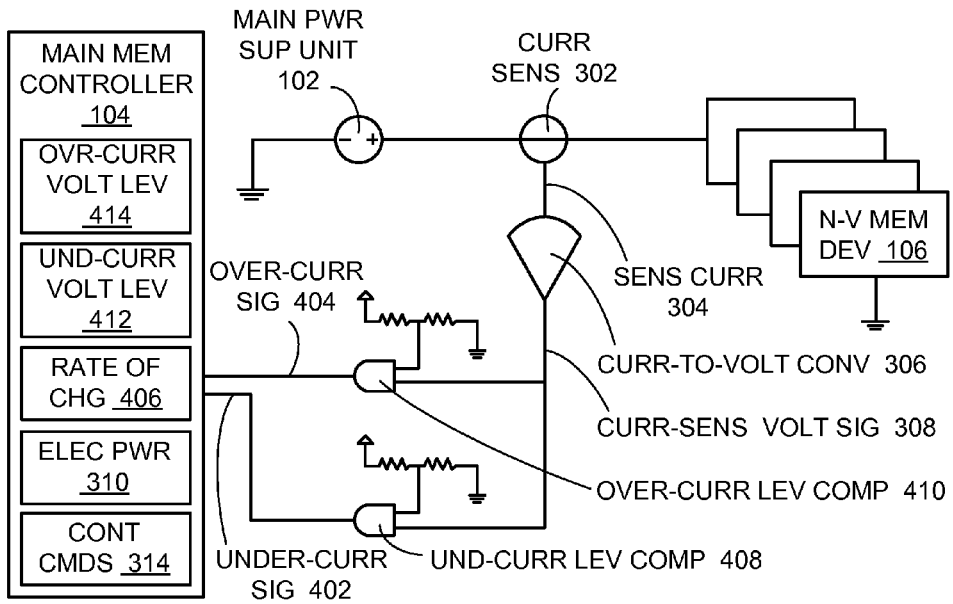
FIG. 4 is a second exemplary block diagram of the power measurement for the power throttling mechanism.

Referring now to FIG. 4, therein is shown a second exemplary block diagram of the power measurement for the power throttling mechanism. FIG. 4 depicts a two-level power sensor implementation for firmware controlled power throttling.

Two inputs, an under-current signal 402 and an over-current signal 404, shown in FIG. 4 can be sent to the main memory controller 104. The under-current signal 402 and the over-current signal 404 can be used by the firmware to limit the number of the parallel operations or the controller commands 314. The under-current signal 402 and the over-current signal 404 indicate when the current-sense voltage signal 308 from the current-to-voltage converter 306 are below and above, respectively, predetermined reference voltage levels.

Since the non-volatile memory devices 106 (or other storage media) do not have an effective way to pause execution of the controller commands 314, the firmware or hardware can use the under-current signal 402 and the over-current signal 404, to determine when the next set of the controller commands 314. The next set of the controller commands 314 can be submitted to the device controllers for controlling the non-volatile memory devices 106. The under-current signal 402 and the over-current signal 404 are external to the main memory controller 104. As a result, a clumping effect of the controller commands 314, which additively cause electrical current spikes, is significantly reduced or eliminated.

As some operations draw more electrical current or power than other operations, the firmware can select, from a queue of the controller commands 314 to be executed, which of the controller commands 314 to group and which of the controller commands 314 to delay. In some cases, just a number of the controller commands 314 are required to be limited for execution.

The firmware can also use the time it takes to transition from under current to over current to determine a rate of change 406 in electrical current requirements for the non-volatile memory devices 106 or media. The firmware can therefore estimate a grouping of a future stream of the controller commands 314. The transition from under current to over current is determined when the under-current signal 402 is asserted to an active state and the over-current signal 404 is subsequently asserted to an active state.

A granularity for power/current compensation allows the SSD or the main memory controller 104 to control the electrical power 310 consumed by the non-volatile memory devices 106 at an operation of a command level versus a sub-operation level. For example, some power/current spikes that occur within a given operation are on the order of 10s of microseconds. Also for example, some power/current spikes occur when a large number of operations are executed in an overlapped or parallel operation and these are on the order of 100s of microseconds to milliseconds of time.

The command level is a method for performing an operation on the non-volatile memory devices 106. For example, the command level including a command to the non-volatile memory devices 106 can be an outstanding erase, a page program, or a read.

These commands can be broken up into pieces at the sub-operation level. For example, the read command can have two parts or sub-operations. One part is instructing the non-volatile memory devices 106 to read values that are stored in the non-volatile memory devices 106 and put them into a shift register. The other part is transferring data out of the shift register in the non-volatile memory devices 106 to the main memory controller 104.

Also for example, and the page program can be split up into two phases or sub-operations. The first phase is transferring data into a shift register in the non-volatile memory devices 106. The second phase is actually programming the non-volatile memory devices 106 with the data stored in the shift register.

The storage control system 100 of FIG. 1 includes an under-current level comparator 408 and an over-current level comparator 410, which are devices that compare the current-sense voltage signal 308 from the current-to-voltage converter 306 to voltage thresholds. The comparison is performed to determine whether the sensed current 304 from the current sensor 302 is below or above the predetermined reference voltage levels.

The under-current level comparator 408 and the over-current level comparator 410 compare the current-sense voltage signal 308 to an under-current voltage level 412 and an over-current voltage level 414 to generate the under-current signal 402 and the over-current signal 404, respectively. The under-current signal 402 and the over-current signal 404 are asserted to an active state when the current-sense voltage signal 308 is below and above the under-current voltage level 412 and the over-current voltage level 414, respectively.

The under-current voltage level 412 and the over-current voltage level 414 are the predetermined reference voltage levels. For example, each of the under-current voltage level 412 and the over-current voltage level 414 can be implemented with a voltage divider using a pair of resistors connected together in series, where one end of one of the resistors is connected to power and one end of another of the resistors is connected to ground.

The current sensor 302 also provides the core voltage 122 to the non-volatile memory devices 106. The core voltage 122 is supplied by the main power supply unit 102.

Figure 5:
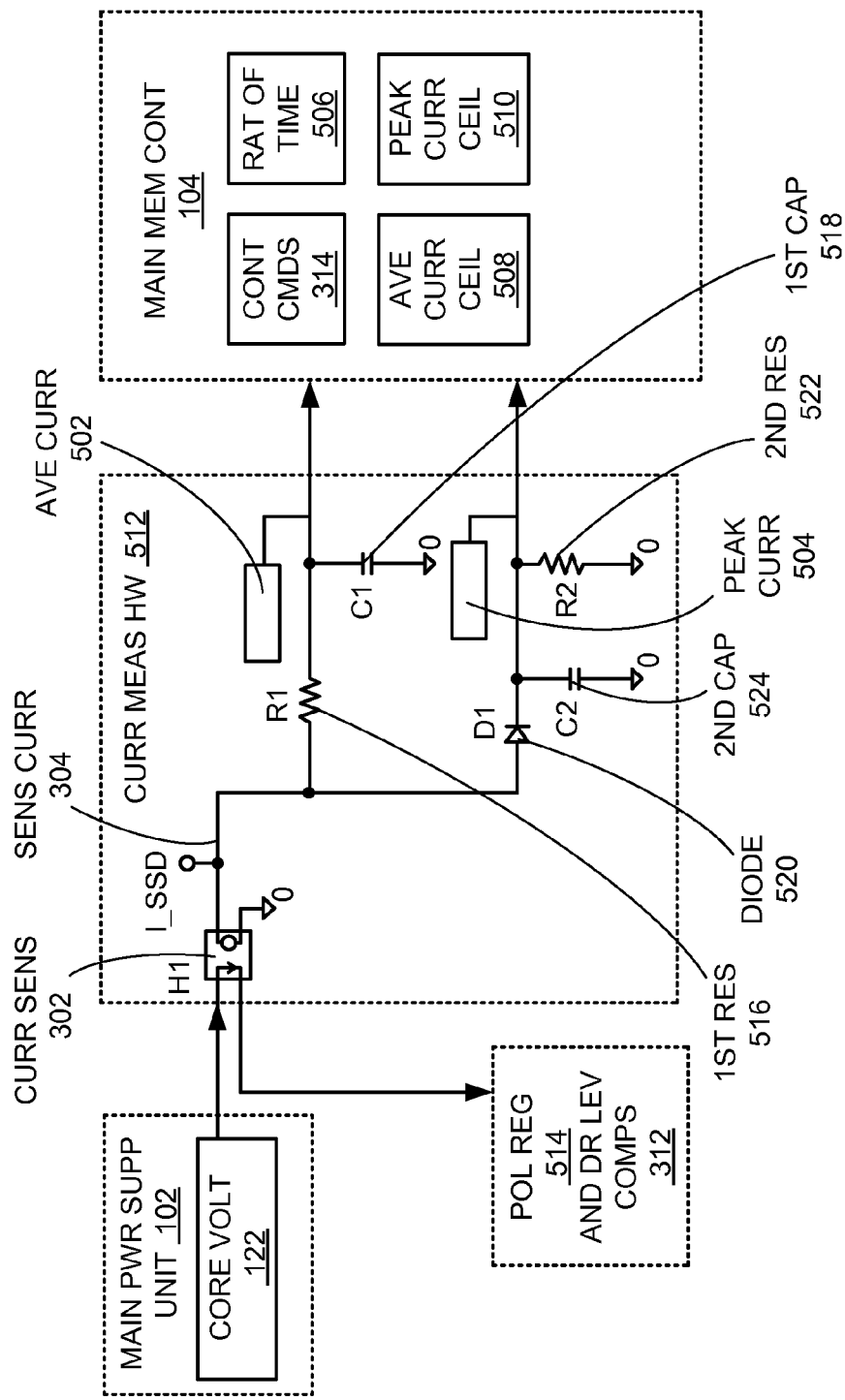
FIG. 5 is a third exemplary block diagram of the power measurement for the power throttling mechanism.

Referring now to FIG. 5, therein is shown a third exemplary block diagram of the power measurement for the power throttling mechanism. FIG. 5 depicts a detailed exemplary block diagram of an electrical current monitoring hardware.

The firmware and the hardware in the main memory controller 104 are implemented to affect input/output (I/O) scheduling of the non-volatile memory devices 106 of FIG. 1 to regulate an average current 502 (Iavg), a peak current 504 (Ipeak), or a combination thereof. The hardware or the software (or the firmware) can compare the average current 502 and the peak current 504 to configurable thresholds.

When the average current 502 and the peak current 504 exceed the configurable thresholds, a clipping event occurs. The clipping event refers to a method by which parallel I/O operations or the controller commands 314 are reduced or limited to a configurable maximum value. The hardware or the software calculates a ratio of time 506 when the clipping event occurs. For example, the ratio of time 506 can be calculated to be any value including 95% of the time or just 1% of the time.

Based on the ratio of time 506, the hardware or the software scales back or reduces a number of the parallel I/O operations or the controller commands 314 to control or reduce the average current 502. Based on the ratio of time 506, the hardware or the software scales back or reduces the number of the parallel I/O operations or the controller commands 314 and increases time between launching the parallel I/O operations or the controller commands 314 to the non-volatile memory devices 106 to scale back or reduce the peak current 504.

Throttling of the parallel I/O operations or the controller commands 314 is engaged quickly (or fast attack) and removed slowly (or slow decay). The goal is to be able to have a mode page parameter tweakable or configurable by a user. The mode page parameter includes an average current ceiling 508 and a peak current ceiling 510, which are the configurable thresholds of the average current 502 and the peak current 504, respectively.

When the average current 502 and the peak current 504 exceed the average current ceiling 508 and the peak current ceiling 510, respectively, the number of the parallel I/O operations, the time between launching the parallel I/O operations, or a combination thereof can be controlled. As a result, the average current 502 and the peak current 504 are scaled back to be below the average current ceiling 508 and the peak current ceiling 510, respectively.

FIG. 5 depicts a host system power supply or the main power supply unit 102 providing a host voltage or the core voltage 122 to a current measurement hardware 512. The current measurement hardware 512 includes the current sensor 302, denoted as H1, for generating the sensed current 304. The sensed current 304 indicates a current consumed by the SSD, denoted as I_SSD. The core voltage 122 is also provided to point-of-load regulators 514 and the drive level components 312 including the non-volatile memory devices 106, the main memory controller 104, and other power consumer components.

The average current 502 can be determined by implementing a series resistor-capacitor circuit using a first resistor 516 and a first capacitor 518 connected together in series. The first resistor 516 and the first capacitor 518 are denoted as R1 and C1, respectively. The sensed current 304 flows through one end of the first resistor 516 and one end of the first capacitor 518 is connected to ground. The average current 502 is at a node where the first resistor 516 and the first capacitor 518 are connected.

The peak current 504 can be determined by implementing an envelope detector or an amplitude demodulator/detector circuit. The envelope detector can be implemented with a diode 520 connected to a parallel resistor-capacitor circuit using a second resistor 522 and a second capacitor 524 connected together in parallel. Another end of the second resistor 522 and another end of the second capacitor 524 are connected together to one end of the diode. The sensed current 304 flows through another end of the diode.

The peak current 504 is at a node where the second resistor 522 and the second capacitor 524 are connected. The peak current 504 is determined based on a sum of branch currents through the second resistor 522 and the second capacitor 524.

Figure 6:
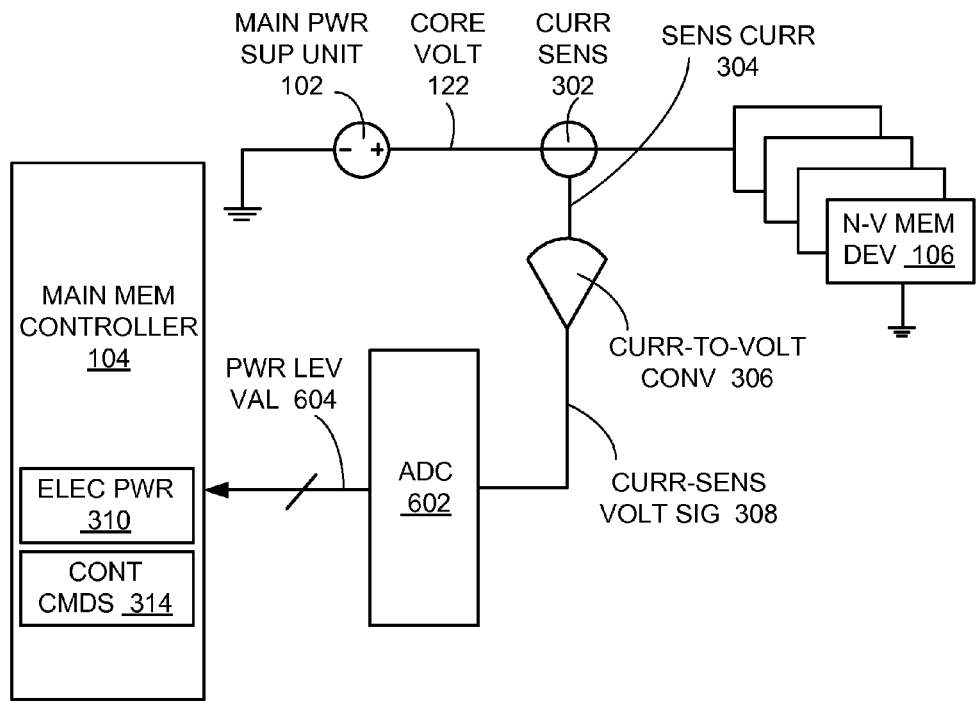
FIG. 6 is a fourth exemplary block diagram of the power measurement for the power throttling mechanism.

Referring now to FIG. 6, therein is shown a fourth exemplary block diagram of the power measurement for the power throttling mechanism. FIG. 6 depicts a full power level detection for hardware controlled power throttling.

The storage control system 100 of FIG. 1 includes an analog-to-digital converter 602, which is a device that converts a continuous physical quantity to a digital number that represents the quantity's amplitude. The conversion involves quantization of the continuous physical quantity. The analogto-digital converter 602 receives the current-sense voltage signal 308 from the current-to-voltage converter 306.

The analog-to-digital converter 602 generates a power level value 604 by converting the current-sense voltage signal 308 from an analog signal to a digital signal. The current-to-voltage converter 306 receives the sensed current 304 from the current sensor 302, which receives the electrical current from the main power supply unit 102 that provides the core voltage 122. The current sensor 302 also provides the core voltage 122 supplied by the main power supply unit 102 to the non-volatile memory devices 106.

The main memory controller 104 samples the power level value 604 to determine how many of the parallel operations or the controller commands 314 to queue up. The main memory controller 104 decreases or increases the number of the parallel operations when the power level value 604 increases or decreases, respectively. The power level value 604 can indicate the full value of the electrical power 310 consumed by the drive level components 312 of FIG. 3.

Figure 7:
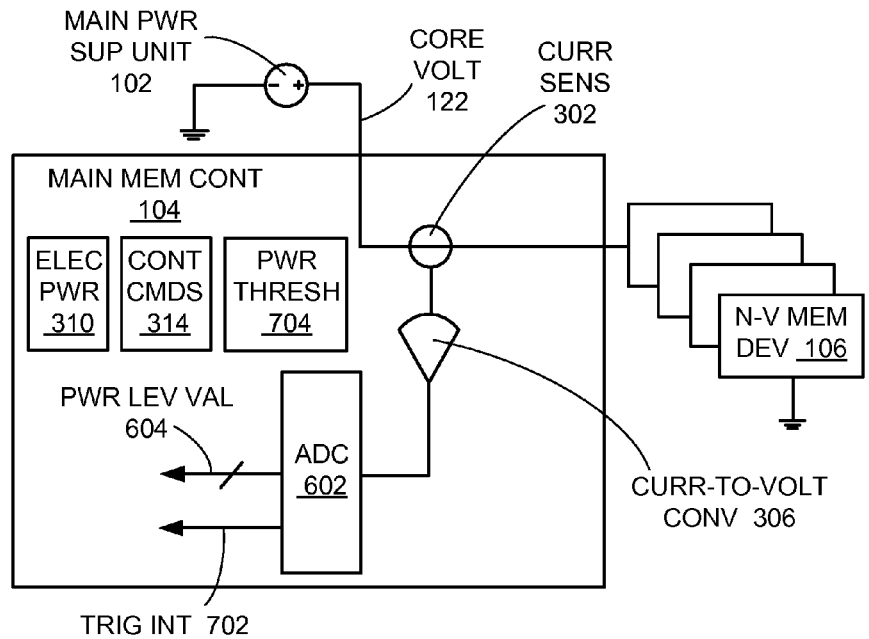
FIG. 7 is a fifth exemplary block diagram of the power measurement for the power throttling mechanism.

Referring now to FIG. 7, therein is shown a fifth exemplary block diagram of the power measurement for the power throttling mechanism. FIG. 7 depicts a full power level detection for hardware-controlled power throttling mechanism implemented internally in the main memory controller 104.

FIG. 7 illustrates a section of a system level design that is used to measure an electrical power or current moved inside the main memory controller 104 including an application-specific integrated circuit (ASIC) NAND controller. The section is implemented within the main memory controller 104 to reduce the overall footprint for the implementation of the main memory controller 104. The section moved inside the main memory controller 104 also goes a long way to reducing errors due to component changes and hardware construction.

The section includes the analog-to-digital converter 602, the current-to-voltage converter 306, and the current sensor 302. The current sensor 302 monitors the electrical current from the main power supply unit 102 that provides the core voltage 122. The current sensor 302 also provides the core voltage 122 supplied by the main power supply unit 102 to the non-volatile memory devices 106.

The analog-to-digital converter 602 generates a trigger interrupt 702 as an input to the main memory controller 104. The trigger interrupt 702 is asserted to an active state when the power level value 604 is greater than a power threshold 704, which is a predetermined numerical value used as a reference for comparison purposes. When the trigger interrupt 702 is active, the main memory controller 104 reduces the number of the parallel operations or the controller commands 314.

The main memory controller 104 can also sample the power level value 604 to determine how many of the parallel operations or the controller commands 314 to queue up. The main memory controller 104 decreases or increases the number of the parallel operations or the controller commands 314 when the power level value 604 increases or decreases, respectively. The power level value 604 can indicate the full value of the electrical power 310 consumed by the drive level components 312 of FIG. 3.

Figure 8:
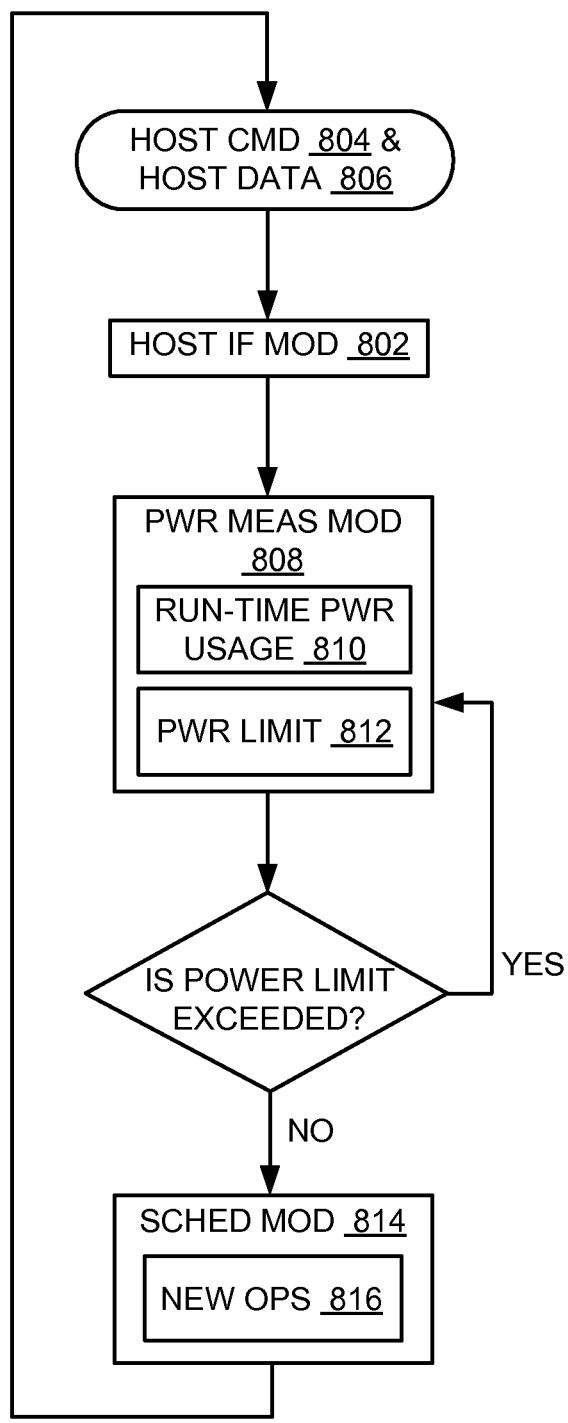
FIG. 8 is a flow chart of the main memory controller of FIG. 1.

Referring now to FIG. 8, therein is shown a flow chart of the main memory controller 104 of FIG. 1. FIG. 8 depicts a polling software flow chart. Along with the hardware described above, the firmware of the main memory controller 104 including a flash controller firmware needs to be enhanced to provide power throttling.

The flow chart shows a simple method for monitoring an instantaneous power usage and scheduling the correct amount of work for backend controllers or the device controllers interfacing with the non-volatile memory devices 106 of FIG. 1. The flow chart shows a polling method of firmware implementation.

The flow chart is a basic system level flow for how power throttling can be used with the hardware in the embodiments described herein. The flow chart shows how the scheduling software takes into account the power being used by the drive before it schedules new work.

The hardware shown in the previously described figures can be used by the firmware in two different forms or methods. The first method can follow the flow chart. The firmware or the software polls the two inputs (high-level and low-level) and make runtime decisions on how many operations for the non-volatile memory devices 106 to schedule. A second method can have the comparator outputs (high-level and low-level) be used to trigger interrupts that would then be used to change limit values in the controller firmware, which affect the amount of work scheduled for the device controllers.

The main memory controller 104 includes a host interface module 802 for interfacing with and receiving information from the host system 120 of FIG. 1. The information incoming from the host system 120 includes host commands 804 and host data 806. The host interface module 802 stores the host commands 804 and the host data 806 into a cache memory and sends a response to the host system 120.

The main memory controller 104 includes a power measurement module 808 for reading a current value of the electrical power 310 of FIG. 3 supplied by the host system 120 in response to the host commands 804. The electrical power 310 is a numerical value associated with a rate at which electric energy. The electrical power 310 can indicate the instantaneous power usage or a run-time power usage 810 of a solid state storage device in the storage control system 100 of FIG. 1. The run-time power usage 810 is an actual value of the electrical power 310 that is consumed by the drive level components 312 of FIG. 3 including the non-volatile memory devices 106 at a specific instance of time during the drive's operation.

The electrical power 310 can be determined based on the current-sense voltage signal 308 of FIG. 3, the under-current signal 402 of FIG. 4, the over-current signal 404 of FIG. 4, the average current 502 of FIG. 5, the peak current 504 of FIG. 5, the power level value 604 of FIG. 6, or a combination thereof. The power measurement module 808 reads a current value of the electrical power 310 consumed by the non-volatile memory devices 106, the main memory controller 104, any of the drive level components 312 of the storage control system 100, or a combination thereof.

The power measurement module 808 compares the electrical power 310 to a power limit 812, which is a numerical value that is associated with a maximum amount of energy allowable to be consumed in the drive. The power limit 812 is associated with the over-current voltage level 414 of FIG. 4, the average current ceiling 508 of FIG. 5, the peak current ceiling 510 of FIG. 5, the power threshold 704 of FIG. 7, or any other value that indicates maximum amount of energy allowable to be consumed in the drive.

If the current value of the electrical power 310 does not exceed or is less than or equal to the power limit 812, the power measurement module 808 requests a schedule module 814 to schedule new operations 816. If the electrical power 310 is greater than the power limit 812, the power measurement module 808 continues to sample the electrical power 310 and compare the electrical power 310 to the power limit 812.

The new operations 816 are tasks that are to be performed for storing, accessing, or managing the non-volatile memory devices 106 in response to the host commands 804 received from the host system 120. The new operations 816 can be at the command level. The new operations 816 can include a group of the controller commands 314 of FIG. 3 that are to be executed in parallel in the non-volatile memory devices 106. The new operations 816 are scheduled for the host data 806 stored in the buffer block 112 of FIG. 1. The controller commands 314 can be generated for scheduling workloads in response to the host commands 804.

The new operations 816 are scheduled using a closed loop method. In other words, the new operations 816 are scheduled such that dynamic run-time adjustments are made by continuously monitoring the SSD's operations while the SSD is in operation. As the SSD goes through different phases of operations including recycling, wear leveling, spare pool and over provisioning resource management, and differing host workloads, the drive can require or utilize differing amounts of the electrical power 310. While the SSD is in operation, the electrical power 310 represents the run-time power usage 810.

The power measurement module 808 employs an instantaneous electrical current or power measurement to determine the electrical power 310 in order to control future electrical current usage. The future electrical current usage is determined by how many of the new operations 816 are to be queued up based on the power limit 812. The future electrical current usage occurs when the new operations are actually executed in the non-volatile memory devices 106.

The instantaneous electrical current or power measurement is a method used to obtain a real-time, immediate reading of the electrical power 310 at a particular instance of time. The particular instance of time is determined based on a time trigger or an operational trigger. For example, the time trigger is an event at a predetermined interval and is used to indicate when to read the electrical power 310. Also for example, the operational trigger is an event when the host commands 804 is received or any of the controller commands 314 is ready to be scheduled.

It has been discovered that scheduling the new operations 816 to be executed in parallel in when the current value of the electrical power 310 does not exceed the power limit 812 provides improved reliability. The reliability is improved because one of the biggest values of the current embodiments that bring to drive operations is the limiting of power spikes not allow by the host system 120, of power levels that are in excess of the capabilities of the host power supply.

It has also been discovered that monitoring the current-sense voltage signal 308 to determine the electrical power 310 provides improved reliability because the monitoring allows a media controller to adjust dynamically the run time power usage of a solid state storage device. As a result, power spikes that create supply voltage transients are eliminated thereby improving the reliability.

It has further been discovered that comparing the current-sense voltage signal 308 to the under-current voltage level 412 of FIG. 4 and the over-current voltage level 414 to determine the electrical power 310 provides improved reliability because the comparing allows an instantaneous electrical current (power) measurement as a means to control future electrical current usage. As a result, power spikes that overwhelm a host environment are eliminated.

It has further been discovered that comparing the average current 502 to the average current ceiling 508 and the peak current 504 to the peak current ceiling 510 to determine the electrical power 310 provides improved reliability because the comparing eliminates power spikes that exceed the regulation capability of the host power system thereby improving the reliability.

It has further been discovered that generating the power level value 604 to determine the electrical power 310 and asserting the trigger interrupt 702 of FIG. 7 when the power level value 604 is greater than the power threshold 704 provide improved reliability. The reliability is improved because the power level value 604 is used for comparison with the power threshold 704 before scheduling the new operations 816. Thus, power spikes that take subsystems offline are eliminated.

It has further been discovered that the section of a system level design that is used to measure the electrical power 310 by generating the power level value 604 and the trigger interrupt 702 within the main memory controller 104 significantly reduces the overall footprint for the implementation of the main memory controller 104. Furthermore, the section moved inside the main memory controller 104 also goes a long way to reducing errors due to component changes and hardware construction.

Functions or operations of the main memory controller 104 as described above can be implemented in hardware, software, or a combination thereof. The main memory controller 104 can be implemented with the control unit 202 of FIG. 2, the storage unit 204 of FIG. 2, the memory interface unit 206 of FIG. 2, the host interface unit 208 of FIG. 2, or a combination thereof.

For example, the host interface module 802 can be implemented with the control unit 202 to receive the host commands 804 from the host system 120 and storing the host data 806 in the buffer block 112. Also for example, the power measurement module 808 can be implemented with the control unit 202, the current sensor 302 of FIG. 3, the current-to-voltage converter 306 of FIG. 3, the under-current level comparator 408 of FIG. 4, the over-current level comparator 410 of FIG. 4, the current measurement hardware 512 of FIG. 5, the analog-to-digital converter 602 of FIG. 6, or a combination thereof to read the current value of the electrical power 310.

Further, for example, the power measurement module 808 can be implemented with the control unit 202, the current sensor 302, and the current-to-voltage converter 306 to monitor the current-sense voltage signal 308 to determine the electrical power 310. Further, for example, the power measurement module 808 can be implemented with the control unit 202, the under-current level comparator 408, and the over-current level comparator 410 to compare the current-sense voltage signal 308 to the under-current voltage level 412 and the over-current voltage level 414.

Further, for example, the power measurement module 808 can be implemented with the control unit 202 and the current measurement hardware 512 to compare the average current 502 to the average current ceiling 508 and the peak current 504 to the peak current ceiling 510. Further, for example, the power measurement module 808 can be implemented with the control unit 202 and the analog-to-digital converter 602 to generate the power level value 604 by converting the current-sense voltage signal 308 from an analog signal to a digital signal and assert the trigger interrupt 702.

For example, the schedule module 814 can be implemented with the control unit 202 to scheduling the new operations 816 to be executed in parallel in the non-volatile memory devices 106.

The power measurement module 808 can be coupled to the host interface module 802. The schedule module 814 can be coupled to the host interface module 802.

The storage control system 100 is described with module functions or order as an example. The modules can be partitioned differently. For example, the power measurement module 808 and the schedule module 814 can be combined. Each of the modules can operate individually and independently of the other modules.

Furthermore, data generated in one module can be used by another module without being directly coupled to each other. Yet further, the power measurement module 808, the power measurement module 808, and the schedule module 814 can be implemented as hardware accelerators (not shown) within the control unit 202 or can be implemented as hardware accelerators (not shown) in the main memory controller 104 or outside of the main memory controller 104.

The physical transformation of scheduling the new operations 816 to be executed in parallel in the non-volatile memory devices 106 with the new operations 816 scheduled when the current value of the electrical power 310 does not exceed the power limit 812 results in movement in the physical world, such as people using the main memory controller 104 based on the operation of the storage control system 100. As the movement in the physical world occurs, the movement itself creates additional information that is converted back to receiving the host commands 804 from the host system 120 and reading the current value of the electrical power 310 supplied by the host system 120 in response to the host commands 804 for the continued operation of the storage control system 100 and to continue the movement in the physical world.

Figure 9:
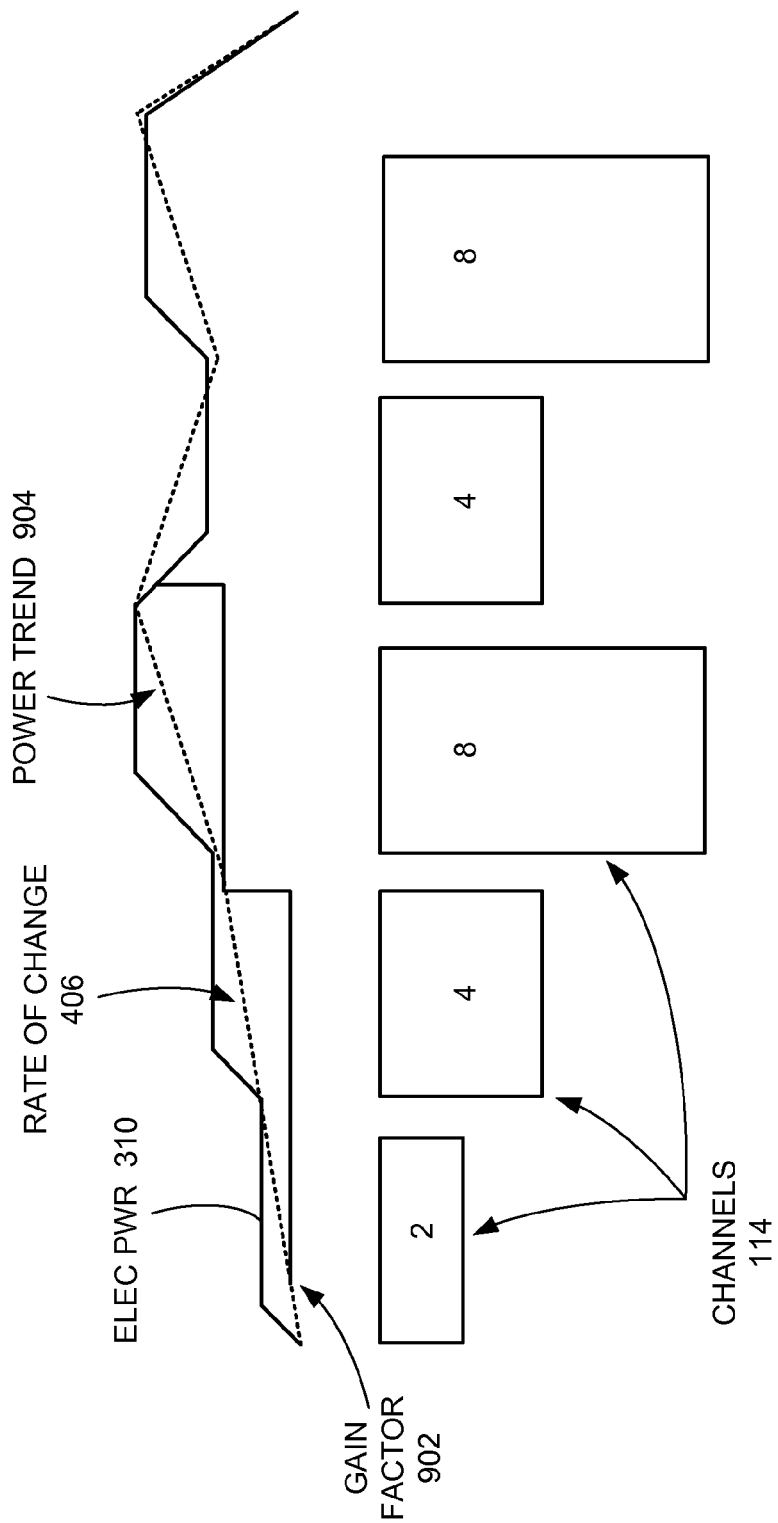
FIG. 9 is an exemplary graph of power anticipation slope measurement for the power throttling mechanism.

Referring now to FIG. 9, therein is shown an exemplary graph of power anticipation slope measurement for the power throttling mechanism. A further enhancement to the polling software previously described in FIG. 8 is to make scheduling changes to the number of the parallel operations based on a power slope or the rate of change 406 of power usage or the electrical power 310 and not just an instantaneous value of the electrical power 310.

The rate of change 406 as a dynamic power control is used to limit instantaneous power changes to the electrical power 310 and so in effect smoothing a power response for a gain factor 902 of K. This method is also used to anticipate workload and power usage or a power trend 904 in the future before the controller commands 314 of FIG. 3 are to be issued to the device controllers.

A solid line in FIG. 9 represents a true power or the electrical power 310 that is actually consumed by the non-volatile memory devices 106 of FIG. 1, the main memory controller 104 of FIG. 1, any of the drive level components 312 of FIG. 3 of the storage control system 100 of FIG. 1, or a combination thereof. A dash line in FIG. 9 represents an integration of the power response and can be used to generate the gain factor 902 to the firmware that executes a power control loop.

The K value can be used in the "Is power limit exceeded?" decision in the flow chart in FIG. 8. Depending on how much of a power spike the host system 120 of FIG. 1 can tolerate, the value of K can be adjusted. The integration of the power response linearly increases or decreases as a number of the channels 114 of FIG. 1 increases or decreases, respectively.

There can be any number of the channels 114 available for the main memory controller 104 to issue the controller commands 314 to device controllers. A lower portion of FIG. 9 depicts rectangular boxes indicating the number of the channels 114 allocated by the main memory controller 104. The number of the channels 114 can indicate a number of active dies determined by the main memory controller 104 for execution of the controller commands 314. The number of the channels 114 can be determined based on the rate of change 406. For example, there can be 8 or 16 of the channels 114 with a number of the non-volatile memory devices 106 in each of the channels 114.

As an example, FIG. 9 depicts that there are two of the channels 114 allocated to perform the workload. As the number of the channels 114 increases to four, the electrical power 310 increases. The electrical power 310 further increases as the number of the channels 114 increases to eight. The electrical power 310 decreases as the number of the channels 114 decreases back down to four and then increases again as the number of the channels 114 increases back up to eight.

The software can receive a number of the host commands 804 of FIG. 8 from the host system 120. The software can then start allocating and doing work on a per channel basis. For example, the main memory controller 104 can receive the host commands 804 including read commands from the host system 120. The main memory controller 104 can issue two of the controller commands 314 including write commands to channels 1 and 2. By the time the main memory controller 104 issues the two of the controller commands 314 to channels 1 and 2, the main memory controller 104 receives more of the host commands 804 from the host system 120.

The main memory controller 104 can issue the controller commands 314 on channels 4, 5, and 6. Then, there are more of the host commands 804 coming in from the host system 120. In this example, what can happen is that the electrical power 310 can start ramping up. The main memory controller 104 can detect the power trend 904 by calculating the rate of change 406 in the electrical power 310.

In the example described above, after eight of the number of the channels 114 are allocated to perform the workload, some of the controller commands 314 executed in channels 2 and 4 may be finished. The main memory controller 104 does not process an absolute value of the electrical power 310 but instead processes the power trend 904. The power trend 904 is used to indicate whether the sensed current 304 of FIG. 3 is ramping up at a very high rate or a slow rate.

If the power trend 904 indicates that the sensed current 304 is starting to ramp up quickly, the main memory controller 104 can throttle back or reduce the number of the controller commands 314. If the power trend 904 indicates that the sensed current 304 is slowly ramping up, the main memory controller 104 can issue more of the controller commands 314 to the non-volatile memory devices 106.

Thus, the main memory controller 104 monitors an amount of change of current, the ramp, or the power trend 904 and determines how many of the parallel operations or the controller commands 314 to issue next. As an example, if the ramp or the power trend 904 is starting to significantly increase, the main memory controller 104 can allocate seven instead of eight of the channels 114.

Figure 10:
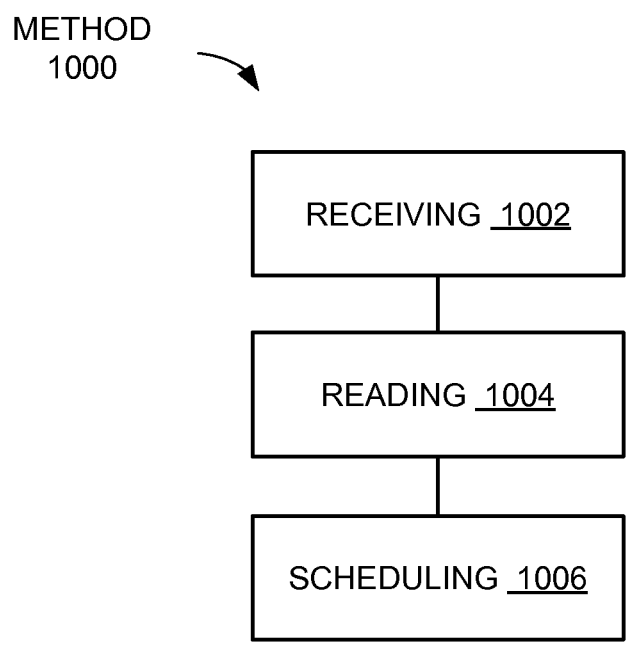
FIG. 10 is a flow chart of a method of operation of a storage control system in a further embodiment of the present invention.

Referring now to FIG. 10, therein is shown a flow chart of a method 1000 of operation of a storage control system in a further embodiment of the present invention. The method 1000 includes: receiving a host command from a host system in a block 1002; reading a current value of an electrical power supplied by the host system in response to the host command in a block 1004; and scheduling new operations to be executed in parallel in non-volatile memory devices, the new operations are scheduled when the current value of the electrical power does not exceed a power limit in a block 1006.

Accordingly, it has been discovered that the present embodiments thus have numerous aspects. One such aspect is that this architecture lays out a means to allow a media controller to adjust dynamically the run time power usage of a solid state storage device.

Another aspect of the present embodiments is that this architecture allows the instantaneous electrical current (power) measurement as a means to control future electrical current usage.

Another aspect of the present embodiments is that this process allows the instantaneous electrical current (power) measurement as a means to control the instantaneous electrical current usage of a solid state storage device.

Another aspect of the present embodiments is that this invention provides a means for the firmware to better schedule NAND workloads to manage total drive power usage.

Another aspect of the present embodiments is that minimum, maximum, and rate of change of electrical current usage is controlled in real time.

Another aspect of the present embodiments is that this process is applied to several sub-sections of the device or the drive for determining NAND power, DRAM power, or the total drive power.

Another aspect of the present embodiments is a means to control current/power at a macro level.

Another aspect of the present embodiments is a means to control current/power at a micro level.

The concept described in the present embodiments can be used in a solid state drive (SSD). This concept can also be retrofitted into almost any SSD product with a need for an addition of power/current measurement hardware and some interface logic to the controller. Products or systems that can benefit from the present embodiments can include all of the stand-alone form factor SSD devices and the storage devices having multiple SSD devices combined and presented to the host as a single unit.

Thus, it has been discovered that the storage control system of the present invention furnishes important and heretofore unknown and unavailable solutions, capabilities, and functional aspects for a storage control system with power throttling mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage control system comprising:
   receiving a host command from a host system;
   at a plurality of times, reading a current value of an electrical power supplied by the host system in response to the host command;
   in accordance with the value of the electrical power at two or more of the plurality of times, determining a rate of change of the electrical power; and
   in accordance with the determined rate of change of the electrical power, scheduling new operations to be executed in parallel in non-volatile memory devices, including determining a number of the new operations to be executed in parallel based at least in part on the determined rate of change of the electrical power;
   wherein reading the current value of the electrical power includes monitoring a current-sense voltage signal to determine the electrical power.

2. The method as claimed in claim 1 wherein reading the current value of the electrical power includes comparing a current-sense voltage signal to an under-current voltage level to determine the electrical power.

3. The method as claimed in claim 1 wherein reading the current value of the electrical power includes comparing a current-sense voltage signal to an over-current voltage level to determine the electrical power.

4. The method as claimed in claim 1 wherein reading the current value of the electrical power includes comparing an average current to an average current ceiling to determine the electrical power.

5. A method of operation of a storage control system comprising:
   receiving a host command and a host data from a host system;
   storing the host data in a buffer block;
   reading a current value of an electrical power supplied by the host system in response to the host command;
   determining a rate of change of the electrical power; and
   scheduling new operations to be executed in parallel in non-volatile memory devices for the host data stored in the buffer block, including determining a number of the new operations to be executed in parallel based at least in part on the determined rate of change of the electrical power.

6. The method as claimed in claim 5 wherein reading the current value of the electrical power includes asserting a trigger interrupt when a power level value is greater than a power threshold to determine the electrical power, the power level value is generated within a main memory controller.

7. The method as claimed in claim 5 wherein reading the current value of the electrical power includes generating a power slope to limit instantaneous power changes to the electrical power, the power slope is for power control of the electrical power based on anticipated power usage in the future.

8. A storage control system comprising:
   a host interface module for receiving a host command from a host system;
   a power measurement module, coupled to the host interface module, for reading, at a plurality of times, a current value of an electrical power supplied by the host system in response to the host command and, in accordance with the value of the electrical power at two or more of the plurality of times, determining a rate of change of the electrical power; and
   a schedule module, coupled to the power measurement module, for scheduling new operations to be executed in parallel in non-volatile memory devices in accordance with the determined rate of change of the electrical power, including determining a number of the new operations to be executed in parallel based at least in part on the determined rate of change of the electrical power;
   wherein the power measurement module is for monitoring a current-sense voltage signal to determine the electrical power.

9. The system as claimed in claim 8 wherein the power measurement module is for comparing a current-sense voltage signal to an under-current voltage level to determine the electrical power.

10. The system as claimed in claim 8 wherein the power measurement module is for comparing a current-sense voltage signal to an over-current voltage level to determine the electrical power.

11. The system as claimed in claim 8 wherein the power measurement module is for comparing an average current to an average current ceiling to determine the electrical power.

12. The system as claimed in claim 8 wherein:
   the host interface module is for receiving a host data from the host system and storing the host data in a buffer block; and
   the schedule module is for scheduling the new operations for the host data stored in the buffer block.

13. The system as claimed in claim 12 wherein the power measurement module is for asserting a trigger interrupt when a power level value is greater than a power threshold to determine the electrical power, the power level value is generated within a main memory controller.

14. The system as claimed in claim 12 wherein the power measurement module is for generating a power slope to limit instantaneous power changes to the electrical power, the power slope is for power control of the electrical power based on anticipated power usage in the future.

15. The method as claimed in claim 1 wherein the rate of change of the electrical power is determined by the length in time of a transition between an under-current voltage level and an over-current voltage level.

16. The method as claimed in claim 1 further comprising, in response to determining an increasing rate of change of the electrical power, decreasing the number of new operations to be executed in parallel.

17. The method as claimed in claim 1 further comprising, in response to determining a rate of change of the electrical power that meets a high rate criterion, decreasing the number of new operations to be executed in parallel.

18. The method as claimed in claim 1 further comprising, in response to determining a rate of change of the electrical power that meets a low rate criterion, increasing the number of new operations to be executed in parallel.

19. The system as claimed in claim 8 wherein the rate of change of the electrical power is determined by the length in time of a transition between an under-current voltage level and an over-current voltage level.

20. The system as claimed in claim 8 wherein, in response to a determination by the power measurement module that the rate of change of the electrical power meets a high rate criterion, the schedule module is for decreasing the number of new operations to be executed in parallel.

21. The system as claimed in claim 8 wherein, in response to a determination by the power measurement module that the rate of change of the electrical power meets a low rate criterion, the schedule module is for increasing the number of new operations to be executed in parallel.

* * * * *